(12) United States Patent
Yu et al.

(10) Patent No.: US 12,028,104 B2
(45) Date of Patent: Jul. 2, 2024

(54) TRANSCEIVER APPARATUS AND TRANSCEIVER DEVICE

(71) Applicant: HUAWEI TECHNOLOGIES CO., LTD., Guangdong (CN)

(72) Inventors: Tianhang Yu, Hangzhou (CN); Gongzheng Zhang, Hangzhou (CN); Rong Li, Hangzhou (CN); Chuili Kong, Hangzhou (CN); Yue Zhou, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 17/540,832

(22) Filed: Dec. 2, 2021

(65) Prior Publication Data

US 2022/0094387 A1 Mar. 24, 2022

Related U.S. Application Data

(63) Continuation of application No. PCT/CN2020/088992, filed on May 7, 2020.

(30) Foreign Application Priority Data

Jun. 5, 2019 (CN) .......................... 201910486718.9

(51) Int. Cl.
*H04B 1/44* (2006.01)
*H01Q 7/00* (2006.01)
(Continued)

(52) U.S. Cl.
CPC ................. *H04B 1/44* (2013.01); *H01Q 7/00* (2013.01); *H04B 15/00* (2013.01); *H04L 5/1461* (2013.01)

(58) Field of Classification Search
CPC . H04B 1/40; H04B 1/44; H04B 15/00; H04B 5/48; H04L 5/1461; H01Q 7/00
(Continued)

(56) References Cited

U.S. PATENT DOCUMENTS 6,137,447 A * 10/2000 Saitoh ................ G06K 7/10336
343/742
6,140,974 A 10/2000 Dalley
(Continued)

FOREIGN PATENT DOCUMENTS

CN 102800993 A 11/2012
CN 103392263 A 11/2013
(Continued)

OTHER PUBLICATIONS

Office Action issued in Chinese Application No. 201910486718.9 on Apr. 26, 2021, 14 pages (with English translation).
(Continued)

*Primary Examiner* — Robert J Lopata
(74) *Attorney, Agent, or Firm* — Fish & Richardson P.C.

(57) ABSTRACT

Embodiments of this application provide example transceiver devices and example transceiver apparatuses used in the example transceiver devices. One example transceiver apparatus includes a transmit antenna and a receive antenna. The transmit antenna is configured to send a local signal to a receive antenna of a peer end. The receive antenna is configured to receive a signal transmitted by a transmit antenna of the peer end. The transmit antenna is on an interference cancellation plane of the receive antenna. The receive antenna is on an interference cancellation plane of the transmit antenna. An interference signal generated by the transmit antenna is canceled on the interference cancellation plane of the receive antenna or the interference cancellation plane of the transmit antenna.

20 Claims, 15 Drawing Sheets

(51) Int. Cl.
    *H04B 15/00*     (2006.01)
    *H04L 5/14*     (2006.01)

(58) Field of Classification Search
    USPC .......................................................... 370/329
    See application file for complete search history.

(56) References Cited

U.S. PATENT DOCUMENTS

| | | |
|---|---|---|
| 9,713,010 B2 * | 7/2017 | Khandani .............. H04B 7/026 |
| 2015/0048977 A1 * | 2/2015 | Khandani ............ H01Q 19/108 |
| | | 343/837 |
| 2018/0145404 A1 * | 5/2018 | Lavedas ................. H01Q 1/525 |
| 2020/0099504 A1 * | 3/2020 | Erricolo ................... H04B 1/58 |

FOREIGN PATENT DOCUMENTS

| | | | |
|---|---|---|---|
| CN | 104025381 | A | 9/2014 |
| CN | 105814869 | A | 7/2016 |
| CN | 205562832 | U | 9/2016 |
| CN | 106685489 | A | 5/2017 |
| CN | 108154995 | A | 6/2018 |
| CN | 109274399 | A | 1/2019 |

OTHER PUBLICATIONS

PCT International Search Report and Written Opinion issued in International Application No. PCT/CN2020/088992 on Jul. 29, 2020, 15 pages (with English translation).

* cited by examiner

TRANSCEIVER APPARATUS AND TRANSCEIVER DEVICE

CROSS-REFERENCE TO RELATED APPLICATIONS

This application is a continuation of International Application No. PCT/CN2020/088992, filed on May 7, 2020, which claims priority to Chinese Patent Application No. 201910486718.9, filed on Jun. 5, 2019. The disclosures of the aforementioned applications are hereby incorporated by reference in their entireties.

TECHNICAL FIELD

This application relates to the field of communications technologies, and in particular, to a transceiver apparatus and a transceiver device in a communications product.

BACKGROUND

Magnetic induction communication has advantages such as high security, low costs, and low power consumption. However, compared with conventional radio frequency communication, the magnetic induction communication usually operates on a frequency band with a low frequency, for example, 13.56 MHz. As a result, system efficiency and a system throughput are limited by bandwidth, a transmission rate is low, and an application scenario of the magnetic induction communication is limited.

The system throughput can be increased by combining the magnetic induction communication with a full-duplex technology. However, there is a problem of signal self-interference in the full-duplex technology. To be specific, when receiving a wanted signal of a transmit antenna located at a communication peer end, a local receive antenna also receives a signal transmitted by a local transmit antenna. Therefore, how to effectively suppress a self-interference signal to ensure normal full-duplex communication is a goal that the industry has been pursuing.

SUMMARY

An objective of this application is to provide a transceiver apparatus and a transceiver device, to improve communication efficiency between transceiver devices, and to effectively suppress a self-interference signal.

The foregoing objective and another objective may be achieved by using features in the independent claims. Further implementations are reflected in the dependent claims, the specification, and the accompanying drawings.

According to a first aspect, an embodiment of this application discloses a transceiver apparatus, including a transmit antenna and a receive antenna. The transmit antenna is configured to send a local signal to a receive antenna of a peer end. The receive antenna is configured to receive a wanted signal transmitted by a transmit antenna of the peer end. One of the transmit antenna and the receive antenna is on an interference cancellation plane of the other of the transmit antenna and the receive antenna, and the interference cancellation plane is a plane on which an interference signal generated by the transmit antenna is canceled.

Herein, the local signal is a signal that is generated by a transceiver apparatus and that needs to be sent to another transceiver apparatus. A peer end is the another transceiver apparatus that communicates with the transceiver apparatus.

The technical solution described in the first aspect includes the transmit antenna and the receive antenna. In other words, a full-duplex technology is used, so that communication efficiency of the transceiver apparatus can be improved. In addition, one of the transmit antenna and the receive antenna is further disposed on the interference cancellation plane of the other of the transmit antenna and the receive antenna, so that the interference signal generated by the local transmit antenna can be effectively canceled. This can effectively suppress a self-interference signal.

According to the first aspect, in an implementation, one of the transmit antenna and the receive antenna is a figure-eight-shaped coil; the other of the transmit antenna and the receive antenna is an axi-symmetrical coil; and a center point of the axi-symmetrical coil is located on the interference cancellation plane of the figure-eight-shaped coil. In this implementation, because both the transmit antenna and the receive antenna are coils, and a long spacing is not required, a requirement on a size of the transceiver apparatus is small. In addition, compared with an isolation method used to cancel antenna interference in a radio frequency system, namely, a solution in which two transmit antennas need to be used, and distances between the two transmit antennas and a receive antenna are half a wavelength, the figure-eight-shaped coil in this solution is actually one coil. In other words, only one transmit path is required, and this is simpler to implement.

In an implementation, a plane on which the axi-symmetrical coil is located is parallel to a connection line between center points of two coils of the figure-eight-shaped coil. In this way, the interference signal generated by the transmit antenna can be canceled. It may be further defined in another implementation that a plane on which the axi-symmetrical coil is located is parallel to a plane on which the figure-eight-shaped coil is located.

In the foregoing embodiment, because coil structures between transceiver apparatuses correspond to each other but are different, two transceiver apparatuses that communicate with each other need to be paired. In other words, transceiver apparatuses that have a same structure cannot communicate with each other. Therefore, in an implementation, the axi-symmetrical coil is also a figure-eight-shaped coil. At least one of the two figure-eight-shaped coils is on the interference cancellation plane of the other. In this way, the transceiver apparatuses may not need to be paired, and applicability of the transceiver apparatuses is improved.

In an implementation, the figure-eight-shaped coil is symmetrically distributed at a center point of a figure eight, and coils located at both sides of the center point have a same quantity of turns. The interference cancellation plane of the figure-eight-shaped coil is a perpendicular bisector plane of a connection line between center points of the two coils of the figure-eight-shaped coil. This can facilitate antenna design and position arrangement, and improve assembly efficiency during production.

In an implementation, one of the transmit antenna and the receive antenna is a pair of parallel and spaced coils; the pair of parallel and spaced coils are axially symmetrical to each other; the other of the transmit antenna and the receive antenna is an absolute coil; and a center point of the absolute coil is located on the interference cancellation plane of the pair of parallel and spaced coils. The pair of parallel and spaced coils are on a same plane. In this implementation, because one of the transmit antenna and the receive antenna is the pair of parallel and spaced coils, namely, two separate coils, the antenna can be conveniently placed. In this way, applicability of the transceiver apparatus is improved, and a position of each coil can be adjusted based on specific space in an installation environment.

In an implementation, the absolute coil is axially symmetrical, and a plane on which the absolute coil is located is parallel to a connection line between center points of two coils of the pair of parallel and spaced coils. In this way, the interference signal generated by the transmit antenna can be canceled. In addition, it may be further defined in another implementation that the absolute coil is axially symmetrical, and a plane on which the absolute coil is located is parallel to a plane on which the pair of parallel and spaced coils are located. In this way, a thickness of the transceiver apparatus can be reduced, which facilitates development of a light and thin transceiver device.

In an implementation, a plane on which the absolute coil is located is perpendicular to a connection line between center points of two coils of the pair of parallel and spaced coils. In this implementation, a shape of the absolute coil may be any shape and does not need to be symmetrical. This facilitates diversified antenna design and improves applicability of the transceiver apparatus.

In an implementation, when the transmit antenna is the pair of parallel and spaced coils, the coils of the pair of parallel and spaced coils have a same quantity of turns, and currents passing through the coils have a same magnitude but opposite directions. Alternatively, when the receive antenna is the pair of parallel and spaced coils, the coils of the pair of parallel and spaced coils have a same quantity of turns, and an electrical signal generated by the receive antenna is a sum of an electrical signal generated by one coil and an electrical signal obtained after an electrical signal generated by the other coil is shifted by 180 degrees. This can cancel the interference signal generated by the transmit antenna, and facilitate antenna design and installation.

In an implementation, when the transmit antenna is the pair of parallel and spaced coils, the coils of the pair of parallel and spaced coils have a same quantity of turns, and currents passing through the coils have a same magnitude and a same direction. Alternatively, when the receive antenna is the pair of parallel and spaced coils, the coils of the pair of parallel and spaced coils have a same quantity of turns, and an electrical signal generated by the receive antenna is a sum of electrical signals generated by coils of the pair of parallel and spaced coils. This can cancel the interference signal generated by the transmit antenna, and facilitate antenna design and installation.

In an implementation, the center point of the absolute coil is on a straight line with the center point of each of the pair of parallel and spaced coils. In this way, a size of the absolute coil is not limited, and a size of each of the pair of parallel and spaced coils and a magnitude and a direction of an energized current are also not limited. This better improves applicability of the transceiver apparatus.

In an implementation, the interference cancellation plane is a perpendicular bisector plane of a connection line between center points of coils of the pair of parallel and spaced coils. This can facilitate antenna installation.

In an implementation, the transmit antenna is a transmit coil, and the receive antenna is a receive coil. A center point of one of the transmit coil and the receive coil is on a middle perpendicular line of the other of the transmit coil and the receive coil; and a plane on which the transmit coil is located is perpendicular to a plane on which the receive coil is located. The middle perpendicular line of the transmit coil is a straight line that passes through the center point of the transmit coil and that is perpendicular to the plane on which the transmit coil is located; and the middle perpendicular line of the receive coil is a straight line that passes through the center point of the receive coil and that is perpendicular to the plane on which the receive coil is located. In this implementation, because both the transmit antenna and the receive antenna are absolute coils, and the transmit antenna does not interfere with the receive antenna, a size and a shape of the coil are not limited. This improves applicability of the transceiver apparatus, and the transceiver apparatus has a simple structure.

Ideally, the interference signal generated by the transmit antenna can be canceled by arranging the antenna in the foregoing implementations. However, in actual application, some interference signals may still exist. Therefore, to further cancel the interference signal, in an implementation, the transceiver apparatus further includes an analog cancellation module configured to perform analog cancellation on a wanted signal received by the receive antenna; and the analog cancellation module includes a gain control module and an adder module. The gain control module is configured to perform gain control on a sent analog signal. The adder module is electrically connected to the gain control module, and is configured to cancel the analog signal sent by the transmit antenna when a wanted signal in an analog form is received.

To further cancel the residual interference signal, in an implementation, the transceiver apparatus further includes a digital cancellation module. The digital cancellation module is configured to perform digital cancellation on a wanted signal that is received by the receive antenna and that is obtained after analog-to-digital conversion. The digital cancellation module includes a channel estimation module and an algorithm module. The channel estimation module is configured to estimate a channel response. The algorithm module is configured to cancel a residual interference signal of a signal sent by the transmit antenna when a wanted signal in a digital form is received.

According to a second aspect, an embodiment of this application discloses a transceiver device. The transceiver device includes a processor, the transceiver device further includes the transceiver apparatus in any one of the foregoing embodiments, and the transceiver apparatus is electrically connected to the processor.

According to a third aspect, an embodiment of this application discloses a transceiver apparatus, including a transmit antenna and a receive antenna. The transmit antenna is disposed on an interference cancellation plane of the receive antenna, and/or the receive antenna is disposed on an interference cancellation plane of the transmit antenna, to cancel an interference signal generated by the transmit antenna.

In an implementation, the transmit antenna has an architecture of a figure-eight-shaped coil. The receive antenna has an architecture of an axi-symmetrical coil. A center point of the transmit antenna is located on a symmetry axis of the receive antenna, and the transmit antenna is symmetrically distributed on both sides of the symmetry axis, so that the receive antenna is located on the interference cancellation plane of the transmit antenna.

In an implementation, the transmit antenna has an architecture of a pair of parallel and spaced coils, and the pair of parallel and spaced coils are axially symmetrical to each other. The receive antenna has an architecture of an absolute coil. A center point of the absolute coil is located on the interference cancellation plane of the transmit antenna.

In an implementation, the transmit antenna is a transmit coil, and the receive antenna is a receive coil. A center point of the transmit coil is on a middle perpendicular line of the receive coil; and a plane on which the transmit coil is located is perpendicular to a plane on which the receive coil is located. The middle perpendicular line of the receive coil is a straight line that passes through a center point of the receive coil and that is perpendicular to the plane on which the receive coil is located.

In the solution described in the third aspect, an architecture of the transmit antenna and an architecture of the receive antenna may also be interchanged. To be specific, the architecture of the transmit antenna in the transceiver apparatus in the embodiments of the third aspect may alternatively be the architecture of the receive antenna, and the architecture of the receive antenna may alternatively be the architecture of the transmit antenna.

According to a fourth aspect, an embodiment of this application discloses a communications system. The communications system includes a network device and the foregoing transceiver device.

According to a fifth aspect, an embodiment of this application discloses a communications system. The communications system includes a mobile terminal and the foregoing transceiver device.

BRIEF DESCRIPTION OF DRAWINGS

To describe the technical solutions in embodiments of this application or in the background, the following briefly describes the accompanying drawings for describing the embodiments of this application or the background.

DESCRIPTION OF EMBODIMENTS

Figure 1:
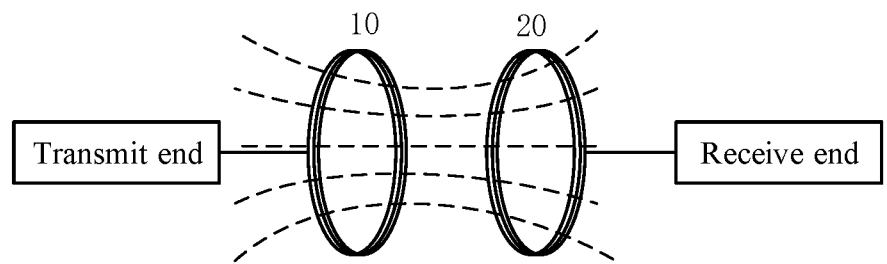
FIG. 1 is a principle diagram of magnetic induction communication.

This application provides a transceiver device and a transceiver apparatus applied to a transceiver device, to improve communication efficiency between transceiver devices by combining magnetic induction communication with a full-duplex communications technology, and to effectively suppress a self-interference signal in the full-duplex technology.

Magnetic induction (MI) communication is a near-field communications technology that uses a magnetic field to transfer information. When being used in an underwater wireless sensor network (UWSN) and an underground wireless sensor network (WUSN), the magnetic induction communication has features such as channel invariance (independent of space-time channel environment parameter transformation), a negligible delay, and a long coverage distance. The magnetic induction communication relies on a near-field magnetic field change. However, conventional radio frequency communication relies on far-field radiation of an electromagnetic wave.

A feature of an electromagnetic field varies depending on a distance between the electromagnetic field and an antenna. Generally, the electromagnetic field is divided into two parts: a near field and a far field. The near-field region may also be referred to as a reaction region. In the reaction region, an electric field and a magnetic field are strongest and can be separately measured. Based on a type of the antenna, a specific field is dominant. For example, energy in a near-field region of a coil usually used in the magnetic induction communication is mainly in a magnetic field, and energy in an electric field is very weak. The far-field region may also be referred to as a radiation region. In the radiation region, the electromagnetic field starts to radiate outwards, and an electric field and a magnetic field are coupled together and influence each other. A boundary between the near field and the far field is not abrupt. Therefore, the boundary between the near field and the far field is not clearly defined. Generally, a near-field region range is at a wavelength level, and may be a range within several wavelengths.

As a key technology of a 5th generation mobile network (5G), a full-duplex (FD) technology can implement simultaneous intra-frequency sending and receiving. This improves system efficiency, reduces a system delay, and doubles a throughput. Therefore, the full-duplex technology is used in a magnetic induction communication scenario. In this way, an advantage of the magnetic induction communication can be retained, and a system throughput can be increased. However, in the full-duplex technology, because of the simultaneous intra-frequency sending and receiving, and because a distance between a receive antenna and a transmit antenna of a full-duplex communication node is far less than a propagation path of an effective signal, a locally sent signal causes strong self-interference to a locally received signal. Therefore, how to suppress strong self-interference to ensure performance and a throughput of a full-duplex communications system is a primary task of adopting the full-duplex communications technology.

The following describes the embodiments of this application with reference to accompanying drawings.

FIG. 1 is a principle diagram of magnetic induction communication. In a near-field region around an inductance coil, energy mainly exists in a form of a magnetic field, and a feature of the near-field magnetic field is similar to a feature of a static magnetic field of a magnetic dipole. As shown in FIG. 1, both a transmit antenna 10 and a receive antenna 20 may be inductive coils. An alternating current of a modulated signal is loaded on the transmit coil. This generates a variable magnetic field in a near-field range of the transmit coil. As shown in a region represented by dotted lines in FIG. 1, the variable magnetic field generates a variable magnetic flux at the receive coil. Because the receive coil has a closed loop, the variable magnetic flux causes the receive coil to generate an induced electromotive force and an induced current, which are further received and demodulated.

Figure 2:
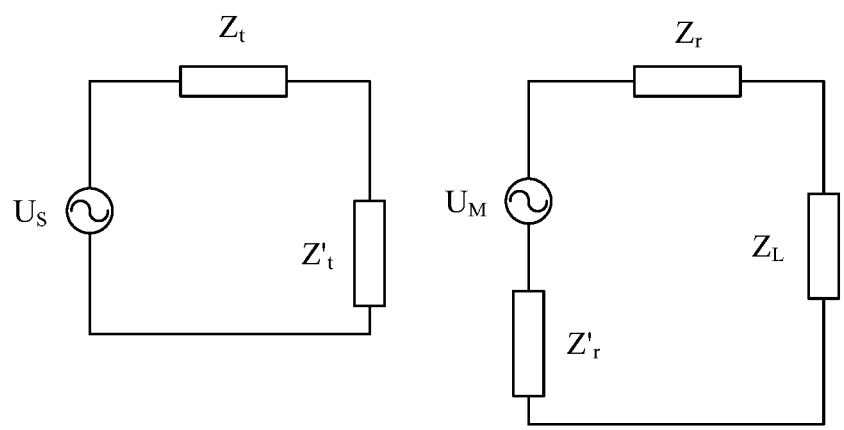
FIG. 2 shows equivalent circuits of a transmit end and a receive end of magnetic induction communication.

FIG. 2 shows equivalent circuits of a transmit end and a receive end of magnetic induction communication. As shown in FIG. 2, $U_S$ is a power supply voltage, and may be understood as a to-be-sent modulated electrical signal. $Z_t$ and $Z_r$ are self-impedances of a transmit coil and a receive coil. $Z'_t$ and $Z'_r$ are equivalent impedances generated by interaction between the receive coil and the transmit coil. $Z_L$ is a load impedance. $U_M$ is an induced electromotive force of the receive coil, and can be considered as a received electrical signal. A relationship between $U_S$, $Z_t$, $Z_r$, $Z'_t$, $Z'_r$, $Z_L$, and $U_M$ is as follows:

$$Z_t = R_t + j\omega L_t$$

$$Z_r = R_r + j\omega L_r$$

$$Z'_t = \frac{\omega^2 M^2}{R_r + j\omega L_r + Z_L}$$

$$Z'_r = \frac{\omega^2 M^2}{R_t + j\omega L_t}$$

$$M = \mu \pi N_t N_r \frac{a_t^2 a_r^2}{2r^3}$$

$$U_M = -j\omega M \frac{U_Z}{R_t + j\omega L_t}.$$

$R_t$ and $L_t$ are resistance and self-inductance of the transmit coil; $R_r$ and $L_r$ are resistance and self-inductance of the receive coil; M is mutual inductance; $N_t$ is a quantity of turns of the transmit coil and $N_r$ is a quantity of turns of the receive coil; $a_t$ is a radius of the transmit coil and $a_r$ is a radius of the receive coil; r is a distance between the transmit coil and the receive coil; and w is an alternating current frequency.

Figure 3A:
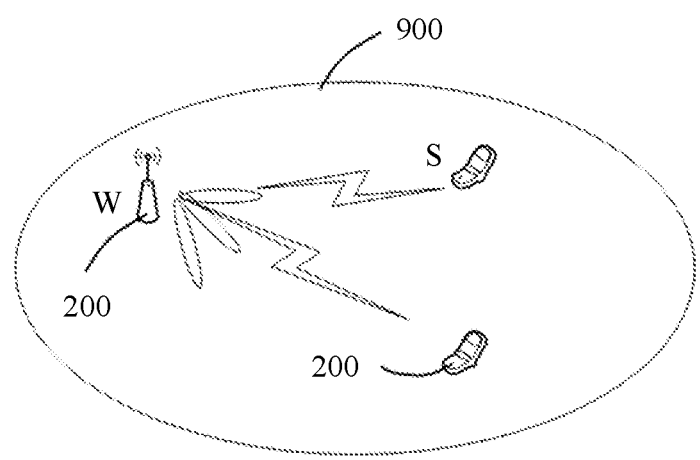
FIG. 3A is a schematic diagram of an architecture of a communications system according to an embodiment of this application.

FIG. 3A is a schematic diagram of an architecture of a communications system according to an embodiment of this application. As shown in FIG. 3A, the communications system 900 includes a plurality of transceiver devices 200. The plurality of transceiver devices 200 can communicate with each other. In this embodiment of this application, the plurality of transceiver devices 200 include a plurality of mobile terminals S and one network device W.

Figure 3B:
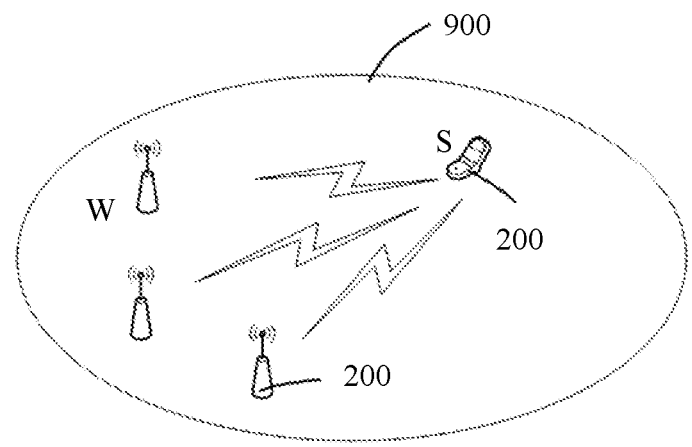
FIG. 3B is a schematic diagram of an architecture of a communications system according to another embodiment of this application.

Refer to FIG. 3B. In another embodiment, the plurality of transceiver devices 200 include one mobile terminal S and a plurality of network devices W. Therefore, in this embodiment of this application, types of the plurality of transceiver devices 200 and a quantity of each type of transceiver devices 200 are not limited, provided that the plurality of transceiver devices 200 can communicate with each other.

In some implementations of this application, the network device W may be an apparatus deployed in a radio access network, to provide a wireless communications function for a terminal device. The network device W may include macro base stations, micro base stations (also referred to as small cells), relay stations, access points, and the like in various forms. For example, the network device W may be a BTS (base transceiver station) in a GSM (global system for mobile communications) or a CDMA (code division multiple access) network, an NB (NodeB) in a WCDMA (wideband code division multiple access) network, or an eNB or eNodeB (evolved NodeB) in an LTE (long term evolution) network. In another implementation, the network device W may alternatively be a radio controller in a CRAN (cloud radio access network) scenario, a base station device in a future 5G network or a network device in a future evolved PLMN network, or a transmission reception point (TRP). The network device W may even be a wearable device, a vehicle-mounted device, or the like, which is not limited herein.

It should be noted that, in systems using different radio access technologies, names of the network device may be different.

In some embodiments, the mobile terminal S may include various handheld devices, vehicle-mounted devices, wearable devices, or computing devices that have a wireless communications function, or other processing devices connected to a wireless modem. For example, the mobile terminal S may further be a mobile station (MS), a subscriber unit, a cellular phone, a smartphone, a wireless data card, a personal digital assistant (PDA) computer, a tablet computer, a wireless modem, a handset, a laptop computer, a machine type communication (MTC) terminal, or the like. This is not limited herein.

It should be noted that the foregoing example is merely intended to describe the transceiver device 200, but is not intended to limit the transceiver device 200, provided that devices having both a receiving function and a sending function belong to the foregoing transceiver device 200.

Figure 4:
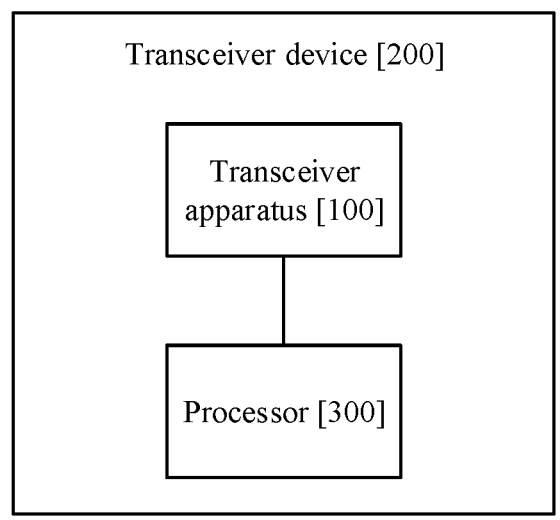
FIG. 4 is a block diagram of a structure of a transceiver device according to an embodiment of this application.

FIG. 4 is a block diagram of a structure of a transceiver device according to an embodiment of this application. As shown in FIG. 4, the transceiver device 200 includes a transceiver apparatus 100 and a processor 300 communicatively connected to the transceiver apparatus 100. The transceiver apparatus 100 is configured to send and receive a communication signal, so that the transceiver device 200 communicates with another transceiver device 200. The processor 300 is configured to: generate a corresponding communication signal, and send the corresponding communication signal by using the transceiver apparatus 100, and the processor 300 is further configured to: parse the communication signal received by the transceiver apparatus 100, and control the transceiver device 200 to perform a corresponding action.

The processor 300 may include one or more processing units. For example, the processor 300 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. In some embodiments, the transceiver device 200 may alternatively include one or more processors 300.

The controller may be a nerve center and a command center of the transceiver device 200. The controller may generate an operation control signal based on instruction operation code and a time sequence signal, to complete control of instruction reading and instruction execution.

A memory may be further disposed in the processor 300, and is configured to store instructions and data. In some embodiments, the memory in the processor 300 is a cache. The memory may store instructions or data just used or cyclically used by the processor 300. If the processor 300 needs to use the instructions or the data again, the processor 300 may directly invoke the instructions or the data from the memory. This avoids repeated access, reduces a waiting time of the processor 300, and improves efficiency of the transceiver device 200.

In some embodiments, the processor 300 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It should be noted that the structure shown in this embodiment of this application does not constitute a specific limitation on the transceiver device 200. In some other embodiments of this application, the transceiver device 200 may include more or fewer components than those shown in the figure, or combine some components, or split some components, or have different component arrangements. The components shown in the figure may be implemented by using hardware, software, or a combination of software and hardware.

Figure 5:
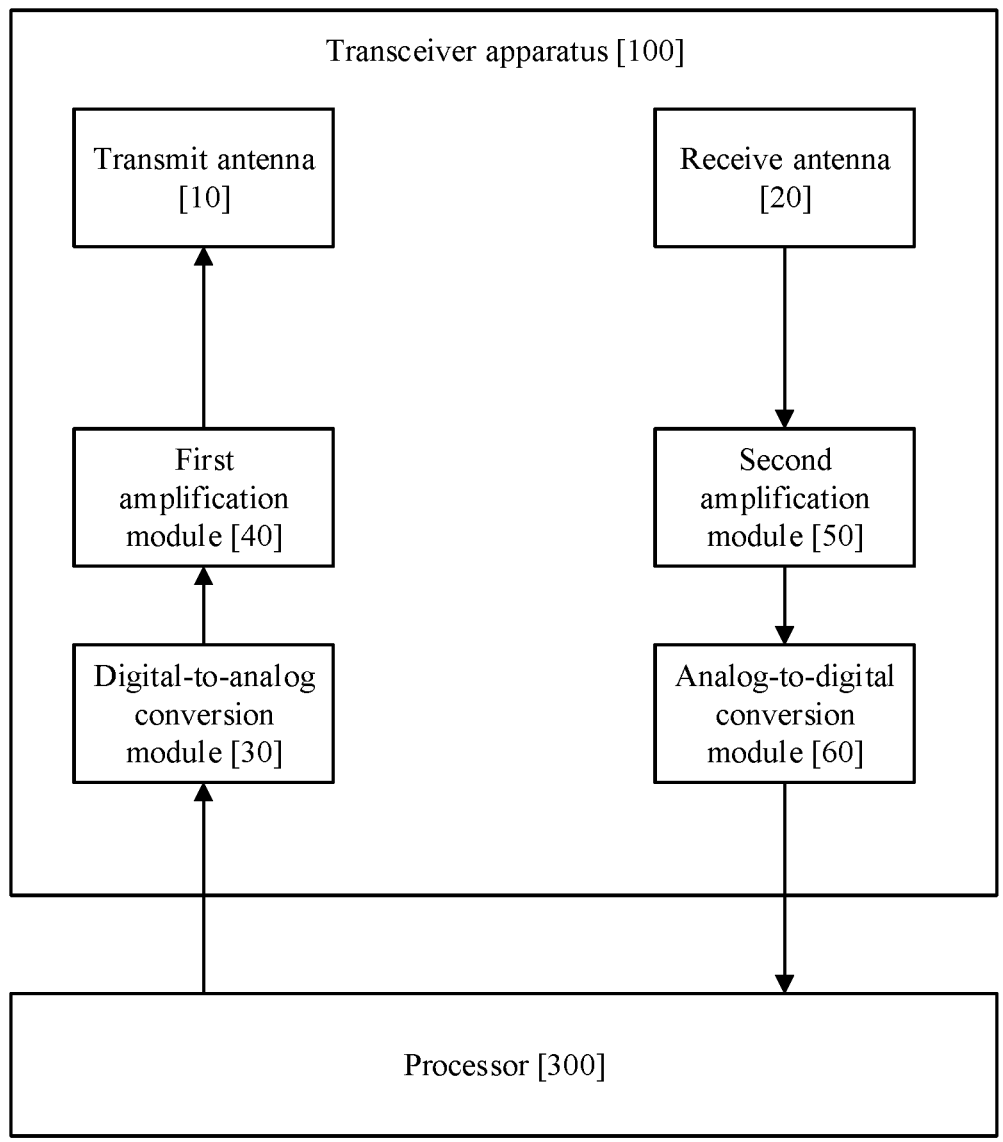
FIG. 5 is a block diagram of a structure of a transceiver apparatus according to an embodiment of this application.

FIG. 5 is a block diagram of a structure of a transceiver apparatus according to an embodiment of this application. As shown in FIG. 5, the transceiver apparatus 100 includes a transmit antenna 10, a receive antenna 20, a digital-to-analog conversion module 30, a first amplification module 40, a second amplification module 50, and an analog-to-digital conversion module 60.

In this implementation, the processor 300 is configured to generate a digital signal in response to a specific instruction. The specific instruction is determined based on a current usage status of the transceiver device 200. For example, when the transceiver device 200 is a mobile terminal, and a current user is communicating with another user by using instant communication software (for example, WeChat), the specific instruction may be a text or a voice input by the user. The processor 300 responds to the specific instruction input by the user, converts the instruction into a corresponding digital signal, and outputs the corresponding digital signal.

The digital-to-analog conversion module 30 is configured to convert a digital signal into an analog signal. The digital-to-analog conversion module 30 may be a digital-to-analog converter (D/A converter).

The first amplification module 40 is configured to amplify the analog signal converted by the digital-to-analog conversion module 30.

The transmit antenna 10 is configured to send an analog signal amplified by the first amplification module 40. In other words, the transmit antenna 10 is configured to send a local signal to a receive antenna of a peer end.

The receive antenna 20 is configured to receive a communication signal sent by the another transceiver device 200. In other words, the receive antenna 20 is configured to receive a wanted signal transmitted by a transmit antenna of the peer end. In addition, when receiving the wanted signal transmitted by the transmit antenna of the peer end, the receive antenna 20 further receives the local signal sent by the transmit antenna 10. In other words, the wanted signal received by the receive antenna 20 has the local interference signal.

The local signal is a signal that is generated by a transceiver device and that needs to be sent to another transceiver device. A peer end is the another transceiver device that communicates with the transceiver device.

The second amplification module 50 is configured to amplify the wanted signal received by the receive antenna 20.

The analog-to-digital conversion module 60 is communicatively connected to the second amplification module 50, and is configured to convert an amplified wanted signal into a digital signal. The analog-to-digital conversion module 60 may be an analog-to-digital converter (A/D converter).

In this embodiment of this application, to cancel interference, from the local signal sent by the transmit antenna 10, to the wanted signal received by the receive antenna 20, one of the transmit antenna 10 and the receive antenna 20 is disposed on an interference cancellation plane of the other of the transmit antenna 10 and the receive antenna 20. The interference cancellation plane is a plane on which an interference signal generated by the transmit antenna 10 is canceled.

The following describes, with reference to specific embodiments, principles of interference cancellation, and how to place one of the transmit antenna 10 and the receive antenna 20 on the interference cancellation plane of the other of the transmit antenna 10 and the receive antenna 20. For ease of describing an interference cancellation mechanism, the wanted signal sent by the another transceiver device 200 is not considered, but only the interference signal generated by the local transmit antenna 10 is considered in the following embodiments.

Figure 6A:
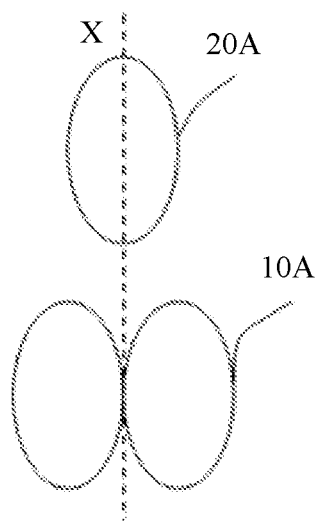
FIG. 6A is a schematic diagram of structures of a transmit antenna and a receive antenna according to a first implementation of this application.

FIG. 6A is a schematic diagram of structures of a transmit antenna and a receive antenna according to a first implementation of this application. In this implementation, the transmit antenna 10A is a figure-eight-shaped coil. The receive antenna 20A is an axi-symmetrical coil. A center point of the receive antenna 20A is located on an interference cancellation plane X of the transmit antenna 10A. A shape of the axi-symmetrical coil is not limited, provided that the coil itself is axially symmetric. For example, the receive antenna 20A may be an axi-symmetrical circular coil, square coil, triangular coil, trapezoidal coil, or the like.

When two coils located on both sides of the center point of the figure-eight-shaped coil are axially symmetrical to each other, and the coils located on the both sides of the center point have a same quantity of turns, the interference cancellation plane X is a perpendicular bisector plane of a connection line between center points of the two coils of the figure-eight-shaped coil. In other words, the interference cancellation plane X is a plane including points whose distances to the center points of the coils on the both sides of the figure-eight-shaped coil are equal. It may be understood that when quantities of turns or sizes of the coils on the both sides of the transmit antenna 10 are different, the interference cancellation plane may be curved.

Figure 6B:
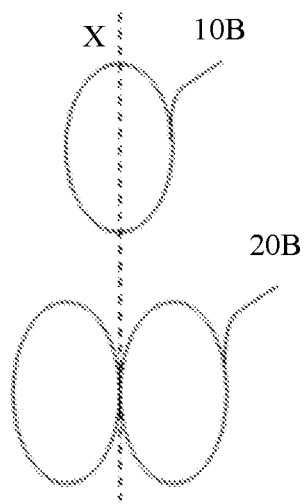
FIG. 6B is a schematic diagram of structures of a transmit antenna and a receive antenna according to a second implementation of this application.

FIG. 6B is a schematic diagram of structures of a transmit antenna and a receive antenna according to a second implementation of this application. In this implementation, the transmit antenna 10B is an axi-symmetrical coil. The receive antenna 20B is a figure-eight-shaped coil. A center point of the transmit antenna 10B is located on an interference cancellation plane X of the receive antenna 20B. In this implementation, structural parameters of the transmit antenna 10B are similar to structural parameters of the receive antenna 20A in the first implementation, and structural parameters of the receive antenna 20B are similar to structural parameters of the transmit antenna 10A in the first implementation. Details are not described herein again.

The following describes principles of canceling an interference signal generated by the transmit antenna 10A by using structures of the transmit antenna 10A and the receive antenna 20A in FIG. 6A as an example.

TABLE 1

| Antenna | Transmit antenna 10A | Receive antenna 20A |
|---|---|---|
| Shape | Figure-eight shape | Circle |
| Radius | r1 | r2 |
| Quantity of turns | N1 | N2 |
| Current | I1 | — |

Figure 7:
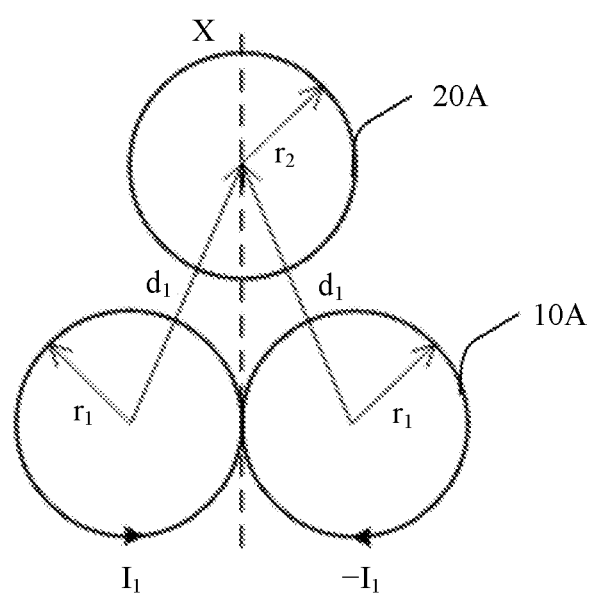
FIG. 7 is a schematic diagram of parameters of the transmit antenna and the receive antenna in FIG. 6A.

As shown in Table 1, it is assumed that quantities of turns of the coils on the both sides of the center of the figure-eight-shaped coil of the transmit antenna 10A are N1, a radius of the figure-eight-shaped coil is r1, and a current passing through the transmit antenna 10 is I1. Magnitudes of currents passing through the coils on the both sides of the center of the figure-eight-shaped coil are equal, but directions of the currents are opposite. It is assumed that a quantity of turns of the coil of the receive antenna 20A is N2, and a radius of the receive antenna 20A is r2. Specifically, as shown in FIG. 7, magnetic fluxes generated by each coil of the transmit antenna 10A on the receive antenna 20A are:

$$\Phi_1 = M_1 I_1 = \mu \pi N_1 N_2 \frac{r_1^2 r_2^2}{2d_1^3} I_1$$

$$\Phi_2 = -M_2 I_2 = -\mu \pi N_1 N_2 \frac{r_1^2 r_2^2}{2d_1^3} I_1$$

$$\Phi = \Phi_1 + \Phi_2 = 0.$$

It can be seen from the foregoing formula that the magnetic fluxes generated by each coil of the figure-eight-shaped coil of the transmit antenna 10A on the receive antenna 20 are: φ1 and φ2. Because φ1 and φ2 are in opposite directions, the magnetic fluxes generated by the transmit antenna 10A on the receive antenna 20A are always 0, so that the receive antenna 20A does not generate an induced electromotive force. In other words, the transmit antenna 10A does not generate an interference signal to the receive antenna 20A.

Similarly, when the transmit antenna 10B and the receive antenna 20B are the structures in the second implementation, the transmit antenna 10B generates two parts of equal magnetic fluxes at the receive antenna 20B, and a change in the magnetic fluxes causes the transmit antenna 10B and the receive antenna 20B to generate equal induced electromotive forces. However, because the receive antenna 20B is the figure-eight-shaped coil, a direction of the induced electromotive force generated by each induction coil is opposite, and two equivalently opposite induced electromotive forces cancel each other out. Therefore, the transmit antenna 10B does not generate an interference signal to the receive antenna 20B either.

It can be learned from the foregoing analysis that, ideally, isolation between the antennas can be implemented, provided that one of the transmit antenna 10 and the receive antenna 20 is disposed on the interference cancellation plane of the other of the transmit antenna 10 and the receive antenna 20. Compared with a radio frequency full-duplex antenna isolation solution, in this application, it only needs to be ensured that the circular coil is located on the interference cancellation plane of the figure-eight-shaped coil, and the transmit antenna 10 and the receive antenna 20 do not need to be spaced by a long distance. Therefore, a requirement on a size of the transceiver apparatus 100 is small. In an isolation method used to cancel antenna interference in a radio frequency system, two transmit antennas need to be used, and distances between the two transmit antennas and a receive antenna are half a wavelength. In addition, the figure-eight-shaped coil in this solution is actually one coil, and only one transmission path is required. This is simpler to implement.

In the first embodiment and the second embodiment, when the transceiver device 200 needs to communicate with another transceiver device, an antenna of the transceiver device at a communication peer end needs to be paired with an antenna in the local transceiver device 200. For example, when the transmit antenna 10 of the local transceiver device 200 is a figure-eight-shaped coil, a receive antenna 20 of a peer transceiver device is required to be a figure-eight-shaped coil. If a transmit antenna of the peer transceiver device is a figure-eight-shaped coil, mutual communication cannot be performed. Further, an application scenario of the transceiver device 200 is limited.

Figure 8A:
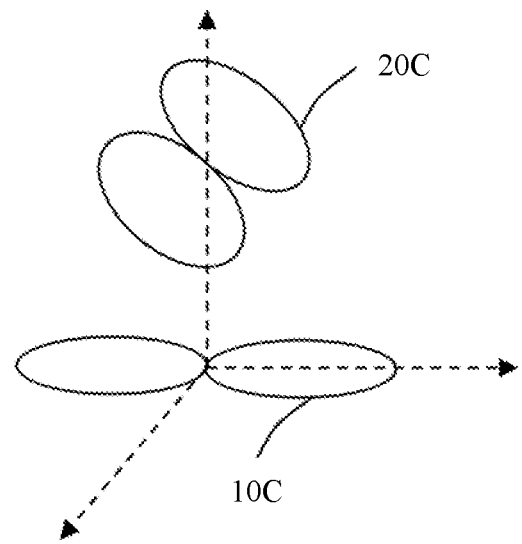
FIG. 8A is a schematic diagram of three-dimensional structures of a transmit antenna and a receive antenna according to a third embodiment of this application.
Figure 8B:
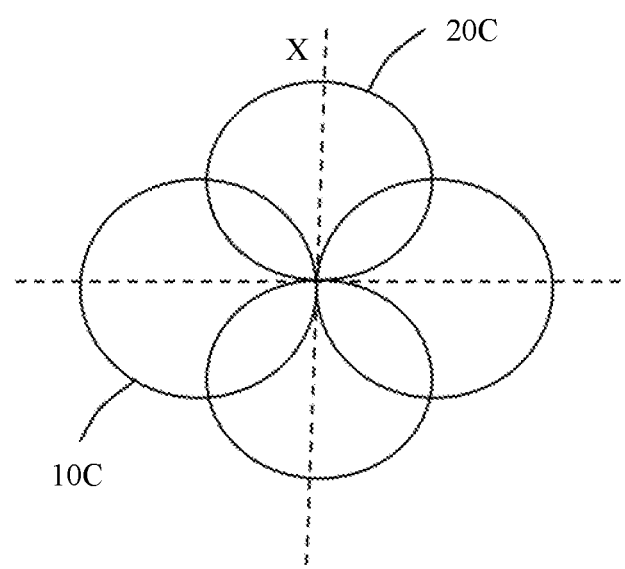
FIG. 8B is a top view of a transmit antenna and a receive antenna according to a third embodiment of this application.

To resolve the foregoing problem, this application further provides a third embodiment. Refer to FIG. 8A and FIG. 8B. FIG. 8A is a schematic diagram of three-dimensional structures of a transmit antenna and a receive antenna according to the third embodiment of this application. FIG. 8B is a top view of the transmit antenna and the receive antenna according to the third embodiment of this application. In this implementation, both the transmit antenna 10C and the receive antenna 20C are figure-eight-shaped coils. In other words, the axi-symmetrical coils in the first embodiment and the second embodiment are also figure-eight-shaped coils. In this implementation, the transmit antenna 10C is on an interference cancellation plane of the receive antenna 20C. Alternatively, the receive antenna 20C is on an interference cancellation plane of the transmit antenna 10C. Alternatively, the transmit antenna 10C is on an interference cancellation plane of the receive antenna 20C, and the receive antenna 20C is on an interference cancellation plane of the transmit antenna 10C. Principles of interference cancellation in this embodiment are similar to the principles of interference cancellation in the first implementation. Details are not described herein again. In this implementation, because both the two antennas are the figure-eight-shaped coils, transceiver devices do not need to be paired. This improves applicability of the transceiver devices.

Because the center point of the axi-symmetrical coil is placed on the interference cancellation plane of the figure-eight-shaped coil in the foregoing embodiments, the interference signal generated by the transmit antenna 10 on the receive antenna 20 can be canceled. However, because the antenna is placed in a three-dimensional space, if a position status of the axi-symmetrical coil relative to the figure-eight-shaped coil changes arbitrarily, an ideal effect of canceling the interference signal generated by the transmit antenna 10 cannot be achieved. In other words, the interference signal still exists. Therefore, to ensure that the interference signal generated by the transmit antenna 10 can be canceled, in an implementation, a plane on which the axi-symmetrical coil is located is parallel to a connection line between center points of two coils of the figure-eight-shaped coil. Alternatively, a plane on which the axi-symmetrical coil is located is parallel to a plane on which the figure-eight-shaped coil is located.

In addition, in an implementation, coils located at both sides of a center point of the figure-eight-shaped coil are axially symmetrical to each other, and the coils located at the both sides of the center point have a same quantity of turns. The interference cancellation plane of the figure-eight-shaped coil is a perpendicular bisector plane of the connection line between the center points of the two coils of the figure-eight-shaped coil. This facilitates antenna design and arrangement.

Figure 9A:
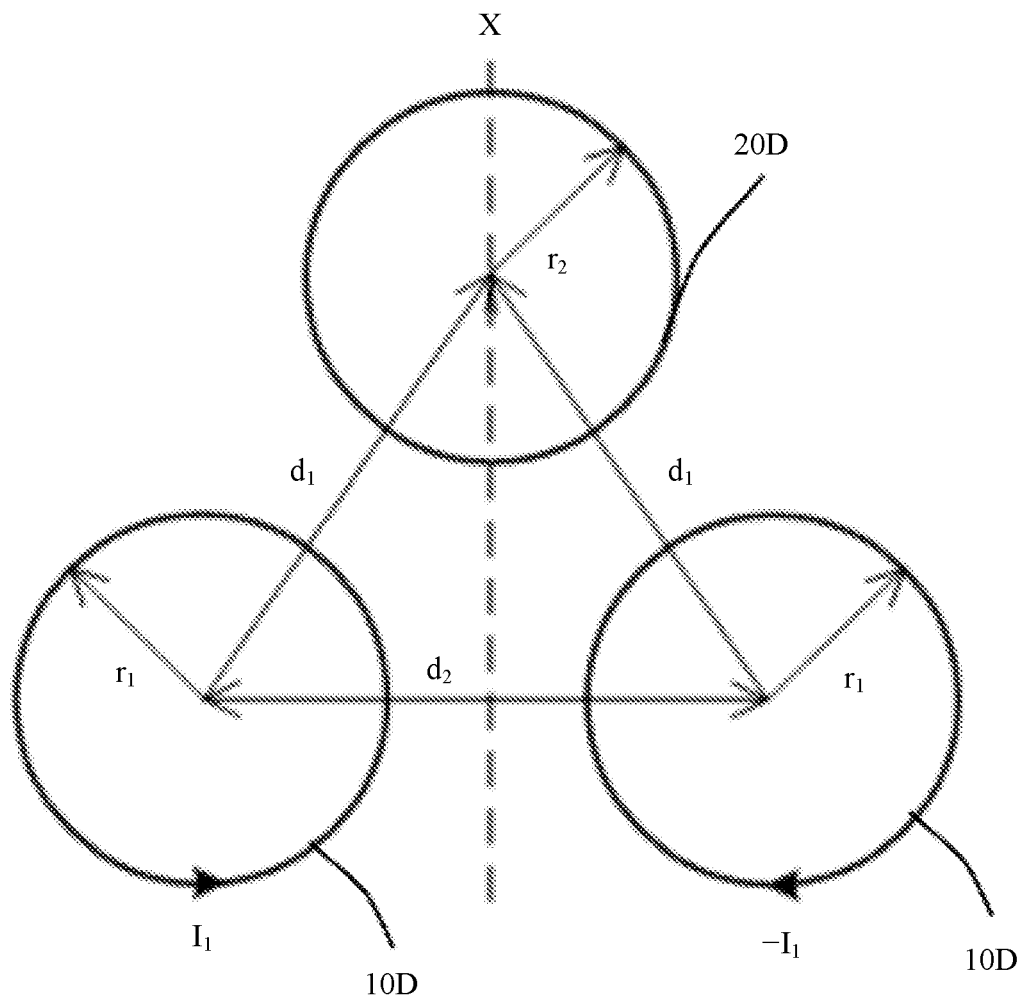
FIG. 9A is a schematic diagram of structures of a transmit antenna and a receive antenna according to a fourth embodiment of this application.

FIG. 9A is a schematic diagram of structures of a transmit antenna and a receive antenna according to a fourth embodiment of this application. As shown in FIG. 9A, in this implementation, the transmit antenna 10D is a pair of parallel and spaced coils. The pair of parallel and spaced coils are on a same plane. The receive antenna 20D is an absolute coil. A center point of the receive antenna 20D is located on an interference cancellation plane X of the transmit antenna 10D. The absolute coil is axially symmetrical, parameters of the pair of parallel and spaced coils are the same, and magnitudes of currents passing through the pair of parallel and spaced coils are equal, but directions of the currents are opposite. The parameters of the coils being the same includes that a quantity of turns and a radius of each coil are the same. In this way, an interference signal generated by the transmit antenna 10D on the receive antenna 20D can be canceled. Principles of interference cancellation in this implementation are similar to the principles of interference cancellation in the first embodiment. Details are not described herein again.

It should be noted that, in this implementation, a receive antenna of a peer end needs to correspond to a structure of the local transmit antenna 10D, and a transmit antenna of a peer end needs to correspond to a structure of the local receive antenna 20D.

Figure 9B:
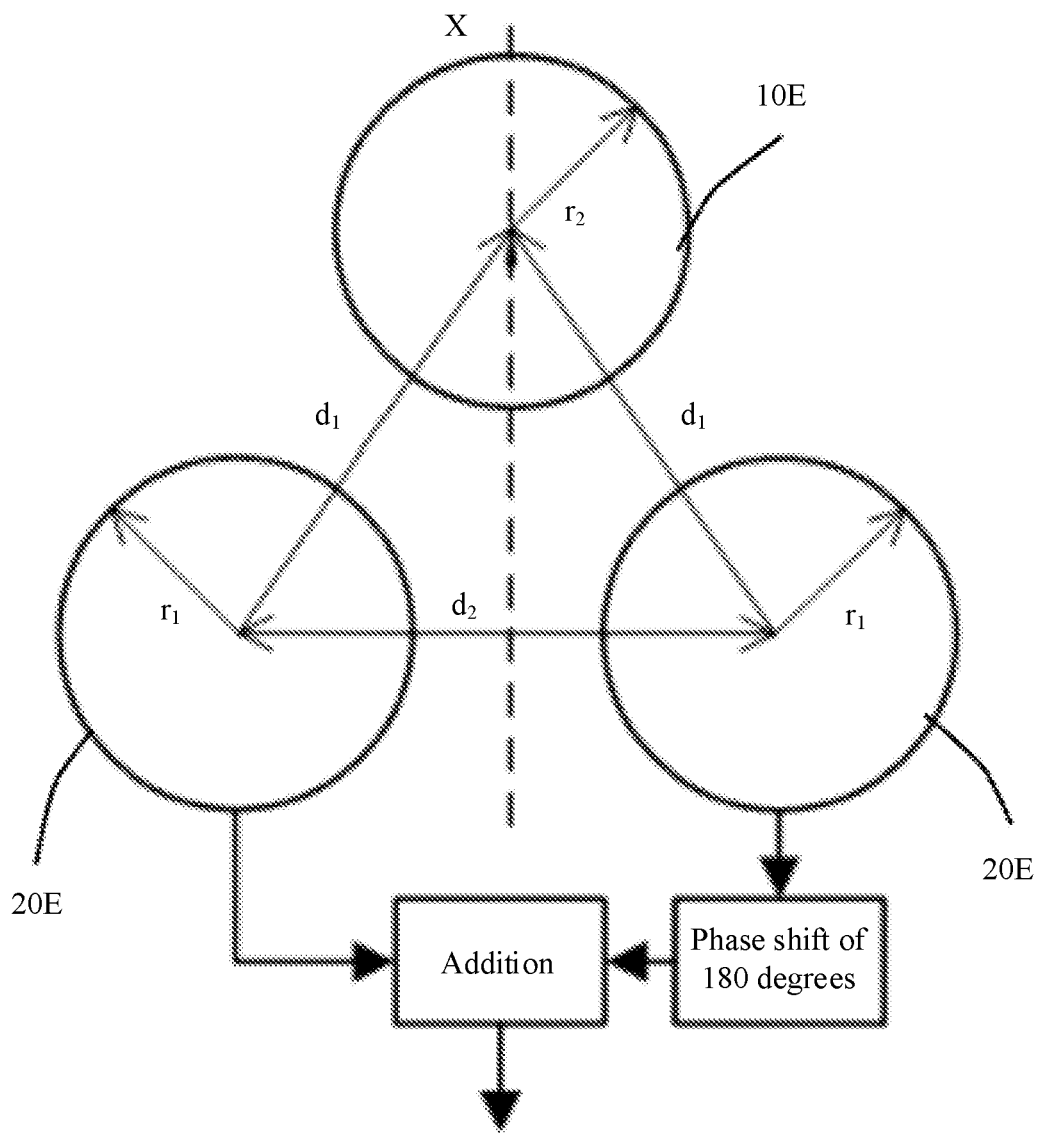
FIG. 9B is a schematic diagram of structures of a transmit antenna and a receive antenna according to a fifth embodiment of this application.

FIG. 9B is a schematic diagram of structures of a transmit antenna and a receive antenna according to a fifth embodiment of this application. As shown in FIG. 9B, the receive antenna 20E is a pair of parallel and spaced coils. The transmit antenna 10E is an absolute coil. A center point of the transmit antenna 10E is located on an interference cancellation plane X of the receive antenna 20E. Quantities of turns and radii of the pair of parallel and spaced coils are the same, and the absolute coil is axially symmetrical.

Figure 10:
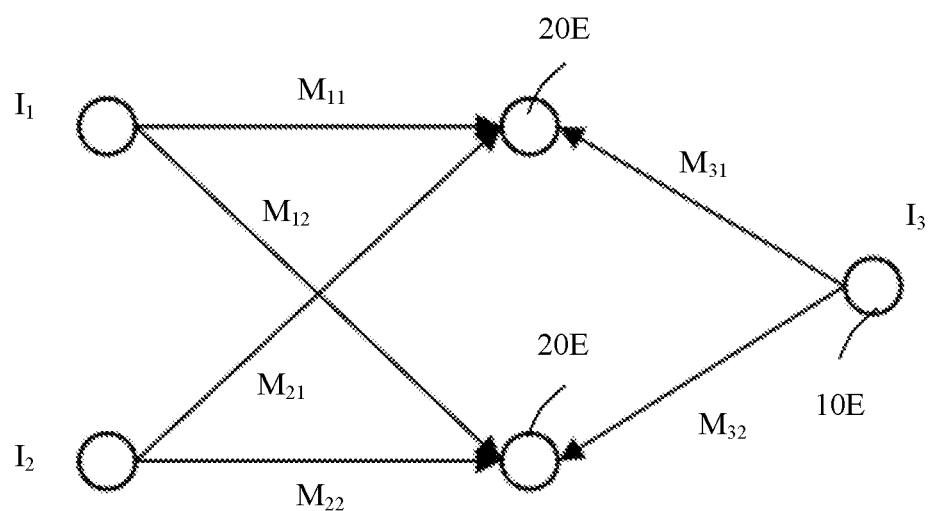
FIG. 10 is a principle diagram of interference analysis between the transmit antenna and the receive antenna in FIG. 9B.

FIG. 10 is a principle diagram of interference analysis between the transmit antenna and the receive antenna in FIG. 9B. In this implementation, because the receive antennas 20E are a pair of parallel and spaced coils, how to cancel interference by using dual coils to obtain a target signal needs to be described. As shown in FIG. 10, a receive coil of the receive antenna 20E is affected by transmit coils. M11 is mutual inductance between one coil of a transmit antenna of a peer end and one coil of the local receive antenna 20E. M12 is mutual inductance between the one coil of the transmit antenna of the peer end and the other coil of the local receive antenna 20E. M21 is mutual inductance between the other coil of the transmit antenna of the peer end and the one coil of the local receive antenna 20E. M22 is mutual inductance between the other coil of the transmit antenna of the peer end and the other coil of the local receive antenna 20E. M31 is mutual inductance between the local transmit antenna 10E and the one coil of the local receive antenna 20E. M32 is mutual inductance between the local transmit antenna 10E and the other coil of the local receive antenna 20E. Therefore, magnetic fluxes induced by the two receive coils of the local receive antenna 20E are:

$$\phi_1 = M_{11} \cdot I_1 + M_{21} \cdot I_2 + M_{31} \cdot I_3$$

$$\phi_2 = M_{22} \cdot I_2 + M_{22} \cdot I_1 + M_{22} \cdot I_3$$

M11=M12, M12=M21, M31=M32, and I2=−I1. In this case, induced electromotive forces generated by the two coils of the receive antenna 20E are:

$$E_1 = (M_{11} - M_{21})\frac{\Delta I_1}{\Delta t} + M_{31}\frac{\Delta I_2}{\Delta t}$$

$$E_2 = -(M_{11} - M_{21})\frac{\Delta I_1}{\Delta t} + M_{31}\frac{\Delta I_2}{\Delta t}.$$

A phase of E2 is rotated by 180 degrees and added to E1, to obtain a total induced electromotive force:

$$E = E_1 - E_2 = 2(M_{11} - M_{21})\frac{\Delta I_1}{\Delta t}.$$

Therefore, a phase shift of 180 degrees may be performed on one of electrical signals received by the two coils of the receive antenna 20E, and the one of electrical signals is added to the other of the electrical signals, so that an interference signal of the transmit antenna 10E can be canceled, and the transmit antenna 10E can be isolated from the receive antenna 20E.

It can be learned from the fourth embodiment and fifth embodiment, one of the transmit antenna 10 and the receive antenna 20 is set as the pair of parallel and spaced coils, and the other of the transmit antenna 10 and the receive antenna 20 is set as the axi-symmetrical coil. The pair of parallel and spaced coils are axially symmetrical to each other. Then, the center point of the axi-symmetrical coil is located on the interference cancellation plane of the pair of parallel and spaced coils, to cancel the interference signal generated by the transmit antenna 10.

To ensure that the transmit antenna 10 can cancel the interference signal generated by the transmit antenna 10, and to facilitate antenna design, in an implementation, a plane on which the absolute coil is located is parallel to a connection line between center points of two coils of the pair of parallel and spaced coils. In addition, it may be further defined in another implementation that a plane on which the absolute coil is located is parallel to a plane on which the pair of parallel and spaced coils are located. A symmetry axis of each of the pair of parallel and spaced coils is on a same straight line. In this way, a thickness of a transceiver apparatus can be reduced, which facilitates development of a light and thin transceiver device.

When the transmit antenna is the pair of parallel and spaced coils, the coils of the pair of parallel and spaced coils have a same quantity of turns, and currents passing through the coils have a same magnitude but opposite directions. In this way, the interference signal generated by the transmit antenna 10 can be canceled. When the receive antenna is the pair of parallel and spaced coils, the coils of the pair of parallel and spaced coils have a same quantity of turns, and an electrical signal generated by the receive antenna is a sum of an electrical signal generated by one coil and an electrical signal obtained after an electrical signal generated by the other coil is shifted by 180 degrees. In this way, the interference signal generated by the transmit antenna 10E can be canceled.

Figure 11A:
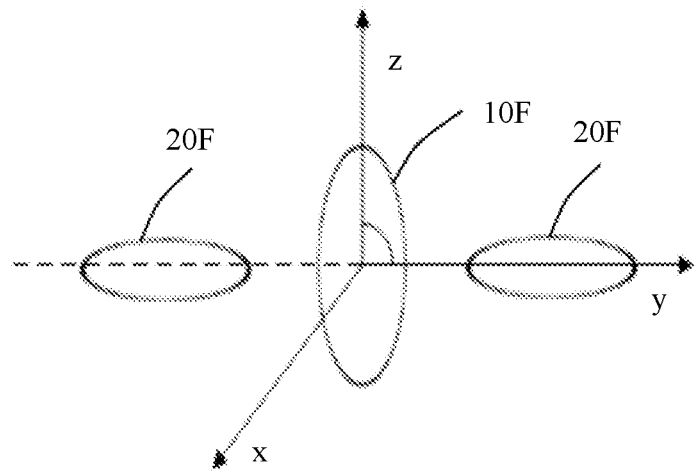
FIG. 11A is a schematic diagram of structures of a transmit antenna and a receive antenna according to a sixth embodiment of this application.

FIG. 11A is a schematic diagram of structures of a transmit antenna and a receive antenna according to a sixth embodiment of this application. In this implementation, different from the fifth embodiment (FIG. 9B), a plane on which the transmit antenna 10F is located is perpendicular to a connection line between center points of two coils of the receive antenna 20F. The center point of the absolute coil is on a straight line with the center point of each of the pair of parallel and spaced coils.

It should be noted that, in this implementation, because the transmit antenna 10F and the receive antenna 20F are placed orthogonally rather than parallelly, a magnetic flux generated by the transmit antenna 10F on each coil of the receive antenna 20F is an integral of a magnetic induction intensity on a coil projection area on a plane perpendicular to a direction of a magnetic induction line. This is shown in the following formula:

$$\Phi = NBS \cos\theta.$$

B is a magnetic induction intensity at the receive antenna 20F, S is an area of each coil of the receive antenna 20F, and θ is an angle between a transmit coil and a receive coil. An angle at which the coil is placed determines a magnitude of a magnetic flux passing through the coil. When two antennas are placed orthogonally (namely, θ=90 degrees in the foregoing formula), a magnetic induction line generated by the transmit antenna 10F cannot pass through a coil of the receive antenna 20F. Therefore, an induced electromotive force, at the receive antenna 20F, affected by the transmit antenna 10F is 0. In other words, the receive antenna 20F is not interfered by the transmit antenna 10F. Therefore, in this implementation, the absolute coil may not be limited to be in an axi-symmetrical shape, and this can facilitate diversified development of antennas. A symmetry axis of each coil of the receive antenna 20F is on a straight line. For example, the symmetry axis of each coil overlaps a y-axis, and each coil may further rotate about the y-axis.

Figure 11B:
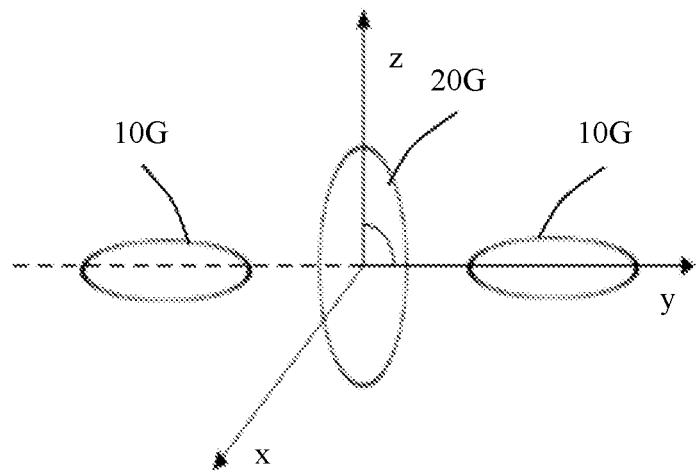
FIG. 11B is a schematic diagram of structures of a transmit antenna and a receive antenna according to a seventh embodiment of this application.

FIG. 11B is a schematic diagram of structures of a transmit antenna and a receive antenna according to a seventh embodiment of this application. Different from the fourth embodiment (FIG. 9A), a plane on which the receive antenna 20G is located is perpendicular to a connection line between center points of two coils of the transmit antenna 10G. The center point of the absolute coil is on a straight line with the center point of each of the pair of parallel and spaced coils. Principles of canceling an interference signal generated by the transmit antenna 10G in this embodiment are similar to principles of canceling an interference signal in the sixth embodiment (FIG. 11A). Details are not described herein again.

It should be noted that, in the seventh embodiment, because the transmit antenna 10G does not interfere with the receive antenna 20G, magnitudes and directions of currents applied to the two coils of the transmit antenna 10G are not limited.

Figure 12A:
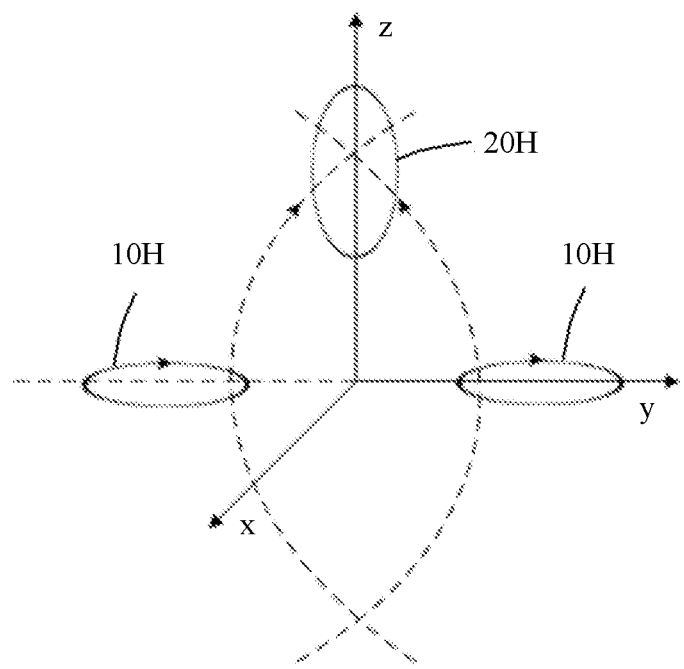
FIG. 12A is a schematic diagram of structures of a transmit antenna and a receive antenna according to an eighth embodiment of this application.

FIG. 12A is a schematic diagram of structures of a transmit antenna and a receive antenna according to an eighth embodiment of this application. Different from the seventh embodiment (FIG. 11B), a plane on which the receive antenna 20H is located is perpendicular to a connection line between center points of two coils of the pair of parallel and spaced coils. However, a center point of the receive antenna 20H is not on a straight line with center points of two coils of the transmit antenna 10H. In this implementation, to enable magnetic induction intensities perpendicular to a direction of the receive antenna 20H to cancel each other out, it is required that coils of the transmit antenna 10H have a same quantity of turns, and currents passing through the coils have a same magnitude and a same direction.

Figure 12B:
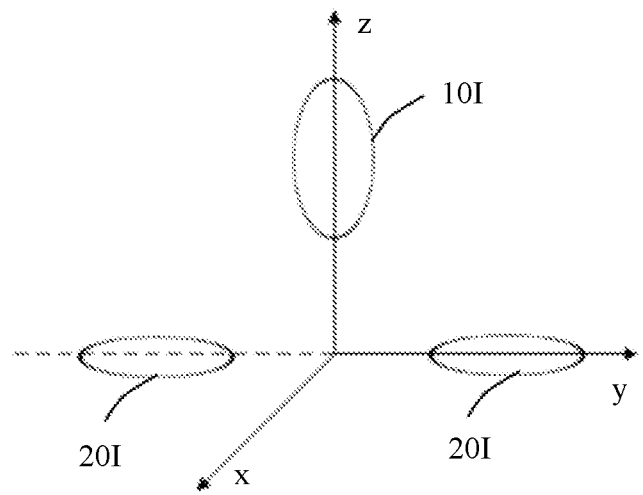
FIG. 12B is a schematic diagram of structures of a transmit antenna and a receive antenna according to a ninth embodiment of this application.

FIG. 12B is a schematic diagram of structures of a transmit antenna and a receive antenna according to a ninth embodiment of this application. Different from the sixth embodiment (FIG. 11A), a plane on which the transmit antenna 10I is located is perpendicular to a connection line between center points of two coils of the receive antenna 20I. However, a center point of the transmit antenna 10I is not on a straight line with the center points of the two coils of the receive antenna 20I. Coils of the receive antenna 20I have a same quantity of turns, and an electrical signal generated by the receive antenna 20I is a sum of electrical signals generated by each coil of the receive antenna 20I. In this embodiment, because magnetic fluxes generated by the transmit antenna 10I on coils of the receive antenna 20I are the same, when directions of magnetic fluxes are opposite, that is, the electrical signals generated by the two coils have a same magnitude but opposite directions, the receive antenna 20I cancels the electrical signals generated by the transmit antenna 10I. In other words, the receive antenna 20I can cancel interference generated by the transmit antenna 10I.

In the fourth embodiment to the ninth embodiment, the interference cancellation plane is a perpendicular bisector plane of a connection line between center points of coils of the pair of parallel and spaced coils. This facilitates antenna design and arrangement.

Figure 13A:
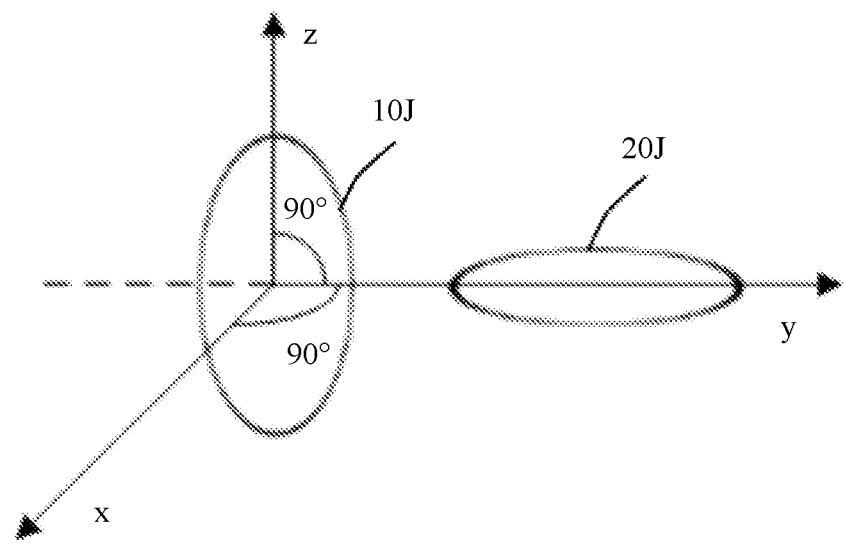
FIG. 13A is a schematic diagram of structures of a transmit antenna and a receive antenna according to a tenth embodiment of this application.

FIG. 13A is a schematic diagram of structures of a transmit antenna and a receive antenna according to a tenth embodiment of this application. As shown in FIG. 13A, in this implementation, the transmit antenna 10J is a transmit coil, and the receive antenna 20J is a receive coil. A center point of the receive coil is on a middle perpendicular line of the transmit coil. A plane on which the transmit coil is located is perpendicular to a plane on which the receive coil is located. The middle perpendicular line of the transmit coil is a straight line that passes through a center point of the transmit coil and that is perpendicular to the plane on which the transmit coil is located. Principles of canceling an interference signal generated by the transmit antenna 10J in this embodiment are similar to principles of canceling an interference signal in the sixth embodiment (FIG. 11A). Details are not described herein again.

Figure 13B:
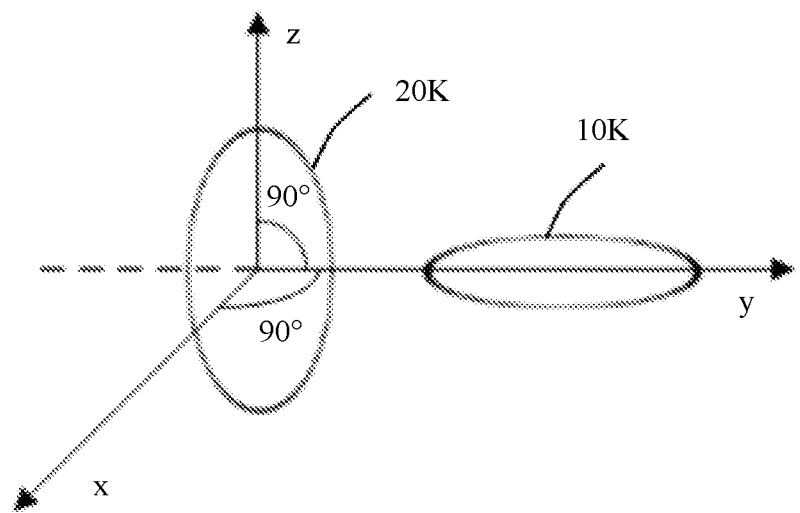
FIG. 13B is a schematic diagram of structures of a transmit antenna and a receive antenna according to an eleventh embodiment of this application.

FIG. 13B is a schematic diagram of structures of a transmit antenna and a receive antenna according to an eleventh embodiment of this application. As shown in FIG. 13B, in this implementation, the transmit antenna 10K is a transmit coil, and the receive antenna 20K is a receive coil. A center point of the transmit coil is on a middle perpendicular line of the receive coil. A plane on which the transmit coil is located is perpendicular to a plane on which the receive coil is located. The middle perpendicular line of the receive coil is a straight line that passes through a center point of the receive coil and that is perpendicular to the plane on which the receive coil is located. Principles of canceling an interference signal generated by the transmit antenna 10K in this embodiment are similar to principles of canceling an interference signal in the sixth embodiment (FIG. 11A). Details are not described herein again.

It can be learned from the tenth embodiment and the eleventh embodiment that, the interference signal generated by the transmit antenna 10 can be canceled, provided that the center point of one of the transmit coil and the receive coil is on the middle perpendicular line of the other of the transmit coil and the receive coil, and the plane on which the transmit coil is located is perpendicular to the plane on which the receive coil is located. In the two embodiments, shapes of the transmit antenna 10 and the receive antenna 20 are not limited.

Figure 14:
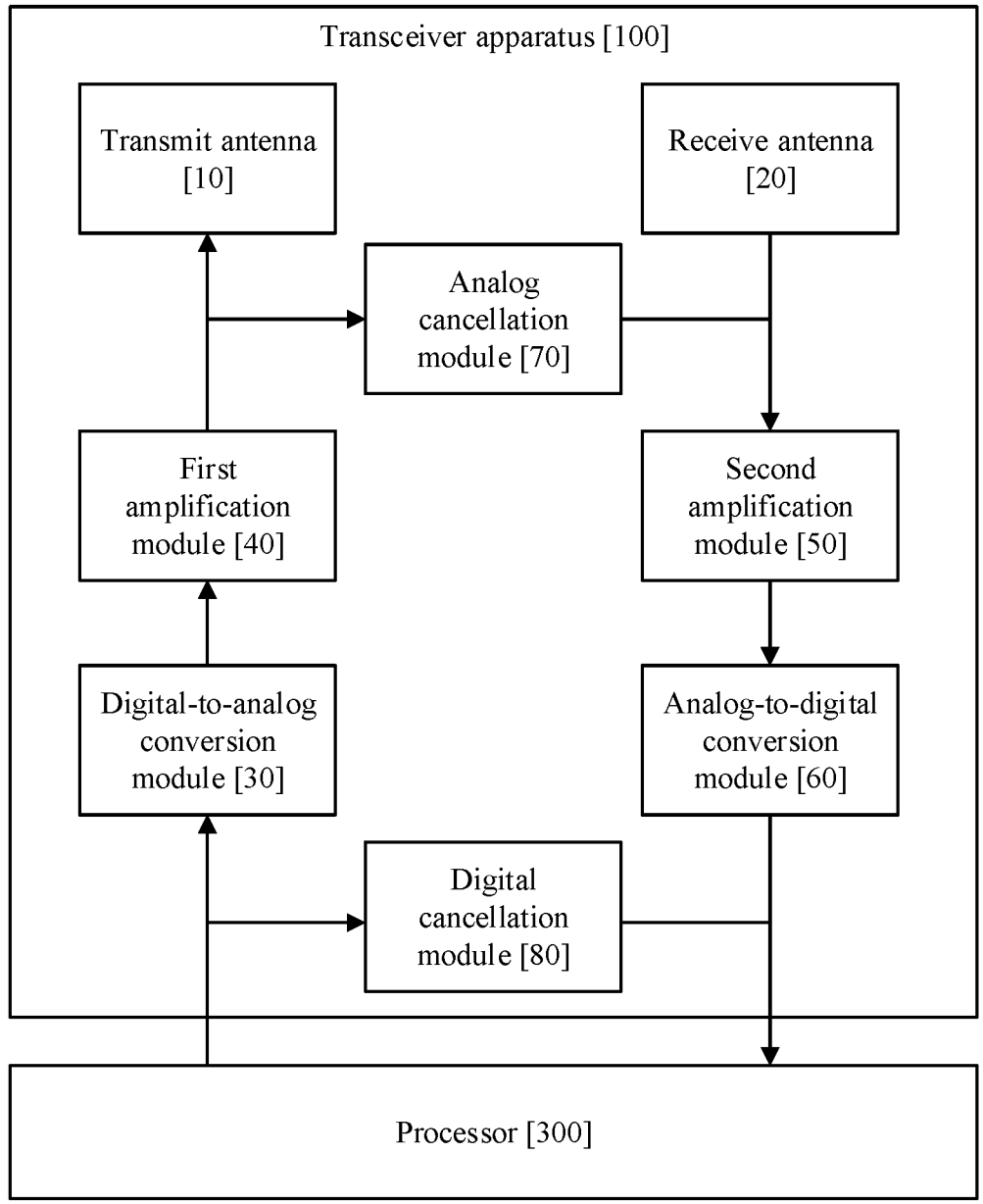
FIG. 14 is a block diagram of a structure of a transceiver device according to another embodiment of this application.

In the first embodiment to the eleventh embodiment, although interference caused by the transmit antenna 10 to the receive antenna 20 can be canceled through design and arrangement of the transmit antenna 10 and the receive antenna 20, in actual application, some interference signals may still exist. Therefore, refer to FIG. 14. In some embodiments, to further cancel the interference signal generated by the local transmit antenna 10 to the local receive antenna 20, the transceiver apparatus 100 further includes an analog cancellation module 70 and a digital cancellation module 80. The analog cancellation module 70 is configured to perform analog cancellation on a wanted signal received by the receive antenna 20. The digital cancellation module 80 is configured to perform digital cancellation on a wanted signal that is received by the receive antenna 20 and that is obtained after analog-to-digital conversion.

Figure 15:
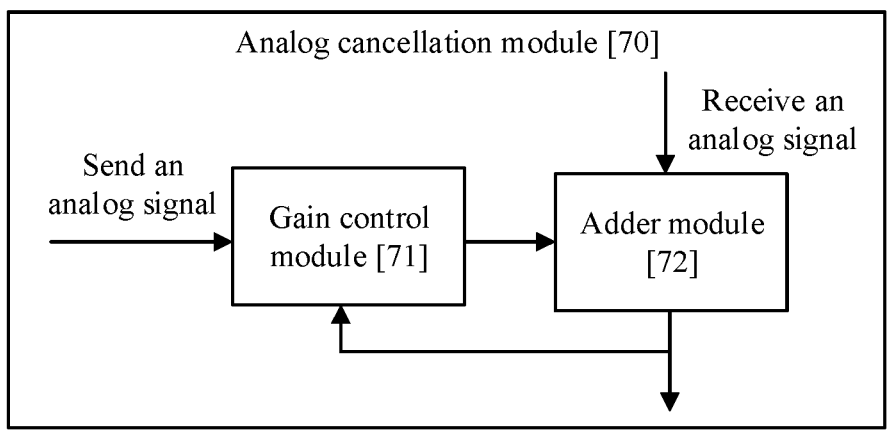
FIG. 15 is a block diagram of a structure of an analog cancellation module in FIG. 14.

FIG. 15 is a block diagram of a structure of an analog cancellation module according to an embodiment of this application. Specifically, the analog cancellation module 70 includes a gain control module 71 and an adder module 72. The gain control module 71 is configured to perform gain control on an analog signal sent by the transmit antenna 10. The adder module 72 is electrically connected to the gain control module 71, and is configured to cancel the sent analog signal when a wanted signal in an analog form is received.

Figure 16:
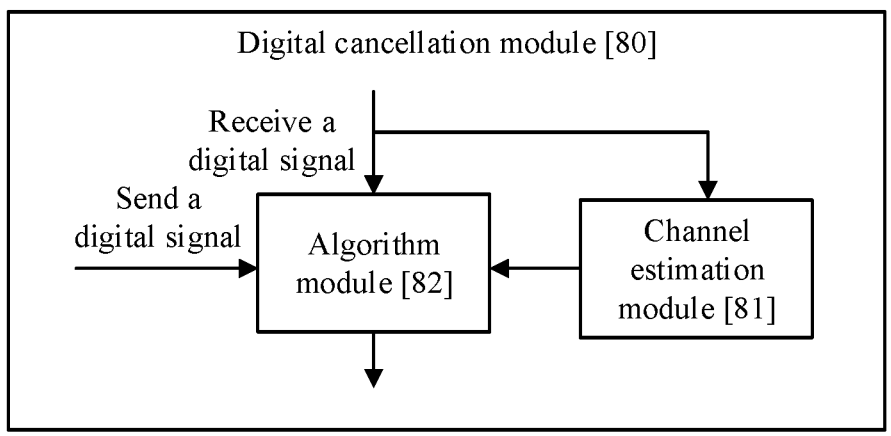
FIG. 16 is a block diagram of a structure of a digital cancellation module in FIG. 14.

FIG. 16 is a block diagram of a structure of a digital cancellation module according to an embodiment of this application. The digital cancellation module 80 includes a channel estimation module 81 and an algorithm module 82. The channel estimation module 81 is configured to estimate a channel response. The algorithm module 82 is configured to cancel a residual interference signal of a signal sent by the transmit antenna 10 when a wanted signal in a digital form is received.

The transceiver device 200 and the transceiver apparatus 100 in the embodiments of this application combine the full-duplex technology and the magnetic induction communication. This can not only utilize advantages of the magnetic induction communication, but also improve communication efficiency of the magnetic induction communication. In addition, a position, an angle, and a posture of a transceiver coil are designed, to cancel self-interference in the full-duplex technology. Therefore, the full-duplex technology is simpler to implement in the magnetic induction communication, and a better isolation effect can be achieved.

The foregoing description is merely a specific implementation of the present disclosure, but is not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A transceiver apparatus, comprising:
a transmit antenna, configured to send a local signal to a receive antenna of a peer end;
a receive antenna, configured to receive a signal transmitted by a transmit antenna of the peer end, wherein the transmit antenna is on an interference cancellation plane of the receive antenna, the receive antenna is on an interference cancellation plane of the transmit antenna, and an interference signal generated by the transmit antenna is canceled on the interference cancellation plane of the receive antenna or the interference cancellation plane of the transmit antenna; and
an analog cancellation module configured to perform analog cancellation on a first signal received by the receive antenna, wherein the analog cancellation module comprises an adder module configured to cancel an analog signal sent by the transmit antenna when the first signal in an analog form is received.

2. The transceiver apparatus according to claim 1, wherein:
one of the transmit antenna and the receive antenna is a first figure-eight-shaped coil;
the other of the transmit antenna and the receive antenna is an axi-symmetrical coil; and
a center point of the axi-symmetrical coil is located on an interference cancellation plane of the first figure-eight-shaped coil.

3. The transceiver apparatus according to claim 2, wherein a plane on which the axi-symmetrical coil is located is parallel to a connection line between center points of two coils of the first figure-eight-shaped coil.

4. The transceiver apparatus according to claim 2, wherein the axi-symmetrical coil is a second figure-eight-shaped coil, and wherein:
the first figure-eight-shaped coil is on an interference cancellation plane of the second figure-eight-shaped coil; or
the second figure-eight-shaped coil is on an interference cancellation plane of the first figure-eight-shaped coil.

5. The transceiver apparatus according to claim 2, wherein:
coils located at both sides of a center point of the first figure-eight-shaped coil are axially symmetrical to each other;
the coils located at the both sides of the center point have a same quantity of turns; and
the interference cancellation plane of the first figure-eight-shaped coil is a perpendicular bisector plane of a connection line between center points of the coils.

6. The transceiver apparatus according to claim 1, wherein:
one of the transmit antenna and the receive antenna is a pair of parallel and spaced coils;

the pair of parallel and spaced coils are axially symmetrical to each other;

the other of the transmit antenna and the receive antenna is an absolute coil; and a center of the absolute coil is located on an interference cancellation plane of the pair of parallel and spaced coils.

7. The transceiver apparatus according to claim 6, wherein the absolute coil is axially symmetrical, and a plane on which the absolute coil is located is parallel to a connection line between center points of two coils of the pair of parallel and spaced coils.

8. The transceiver apparatus according to claim 6, wherein a plane on which the absolute coil is located is perpendicular to a connection line between center points of two coils of the pair of parallel and spaced coils.

9. The transceiver apparatus according to claim 7, wherein:

when the transmit antenna is the pair of parallel and spaced coils, the pair of parallel and spaced coils comprise a first coil and a second coil, the first coil and the second coil have a same quantity of turns, a first current passes through the first coil, a second current passes through the second coil, the first current and the second current have a same magnitude but opposite directions; or when the receive antenna is the pair of parallel and spaced coils, the pair of parallel and spaced coils comprise a first coil and a second coil, the first coil and the second coil have a same quantity of turns, and an electrical signal generated by the receive antenna is a sum of an electrical signal generated by the first coil and an electrical signal obtained after an electrical signal generated by the second coil is shifted by 180 degrees.

10. The transceiver apparatus according to claim 8, wherein:

when the transmit antenna is the pair of parallel and spaced coils, the pair of parallel and spaced coils comprise a first coil and a second coil, the first coil and the second coil have a same quantity of turns, a first current passes through the first coil, a second current passes through the second coil, the first current and the second current have a same magnitude and a same direction; or when the receive antenna is the pair of parallel and spaced coils, the pair of parallel and spaced coils comprise a first coil and a second coil, the first coil and the second coil have a same quantity of turns, and an electrical signal generated by the receive antenna is a sum of electrical signals generated by the first coil and the second coil.

11. The transceiver apparatus according to claim 8, wherein a center point of the absolute coil is on a straight line with a center point of each of the pair of parallel and spaced coils.

12. The transceiver apparatus according to claim 6, wherein the interference cancellation plane of the receive antenna or the interference cancellation plane of the transmit antenna is a perpendicular bisector plane of a connection line between center points of coils of the pair of parallel and spaced coils.

13. The transceiver apparatus according to claim 1, wherein:

the transmit antenna is a transmit coil;
the receive antenna is a receive coil;

a center point of one of the transmit coil and the receive coil is on a middle perpendicular line of the other of the transmit coil and the receive coil;

a plane on which the transmit coil is located is perpendicular to a plane on which the receive coil is located, wherein the middle perpendicular line of the transmit coil is a straight line that passes through the center point of the transmit coil and that is perpendicular to the plane on which the transmit coil is located; and the middle perpendicular line of the receive coil is a straight line that passes through the center point of the receive coil and that is perpendicular to the plane on which the receive coil is located.

14. The transceiver apparatus according to claim 1, wherein:

the analog cancellation module comprises a gain control module, wherein the gain control module is configured to perform gain control on the analog signal sent by the transmit antenna; and the adder module is electrically connected to the gain control module.

15. The transceiver apparatus according to claim 14, wherein:

the transceiver apparatus further comprises a digital cancellation module;

the digital cancellation module is configured to perform digital cancellation on a second signal that is received by the receive antenna and that is obtained after analog-to-digital conversion;

the digital cancellation module comprises a channel estimation module and an algorithm module, wherein the channel estimation module is configured to estimate a channel response; and the algorithm module is configured to cancel a residual interference signal of a signal sent by the transmit antenna when the second signal in a digital form is received.

16. A transceiver device, wherein the transceiver device comprises:

at least one processor; and a transceiver apparatus electrically connected to the at least one processor, wherein the transceiver apparatus comprises:

a transmit antenna, configured to send a local signal to a receive antenna of a peer end;

a receive antenna, configured to receive a signal transmitted by a transmit antenna of the peer end, wherein the transmit antenna is on an interference cancellation plane of the receive antenna, the receive antenna is on an interference cancellation plane of the transmit antenna, and an interference signal generated by the transmit antenna is canceled on the interference cancellation plane of the receive antenna or the interference cancellation plane of the transmit antenna; and an analog cancellation module configured to perform analog cancellation on a first signal received by the receive antenna, wherein the analog cancellation module comprises an adder module configured to cancel an analog signal sent by the transmit antenna when the first signal in an analog form is received.

17. The transceiver device according to claim 16, wherein:

one of the transmit antenna and the receive antenna is a first figure-eight-shaped coil;

the other of the transmit antenna and the receive antenna is an axi-symmetrical coil; and a center point of the axi-symmetrical coil is located on an interference cancellation plane of the first figure-eight-shaped coil.

18. The transceiver device according to claim 17, wherein
a plane on which the axi-symmetrical coil is located is parallel to a connection line between center points of two coils of the first figure-eight-shaped coil;
the axi-symmetrical coil is a second figure-eight-shaped coil, and; wherein:
  the first figure-eight-shaped coil is on an interference cancellation plane of the second figure-eight-shaped coil; or
  the second figure-eight-shaped coil is on an interference cancellation plane of the first figure-eight-shaped coil; or
coils located at both sides of a center point of the first figure-eight-shaped coil are axially symmetrical to each other, wherein the coils located at the both sides of the center point have a same quantity of turns, and wherein the interference cancellation plane of the first figure-eight-shaped coil is a perpendicular bisector plane of a connection line between center points of the coils.

19. The transceiver device according to claim 17, wherein:
  one of the transmit antenna and the receive antenna is a pair of parallel and spaced coils;
  the pair of parallel and spaced coils are axially symmetrical to each other;
  the other of the transmit antenna and the receive antenna is an absolute coil; and
  a center of the absolute coil is located on an interference cancellation plane of the pair of parallel and spaced coils.

20. The transceiver device according to claim 19, wherein:
  the absolute coil is axially symmetrical, and a plane on which the absolute coil is located is parallel to a connection line between center points of two coils of the pair of parallel and spaced coils; or
  a plane on which the absolute coil is located is perpendicular to a connection line between center points of two coils of the pair of parallel and spaced coils.

* * * * *